July 8, 1924.                                                    1,500,860
S. YÔ
ELECTRIC CONTROL SYSTEM
Filed May 17

Inventor:
Seigo Yô,
by Albert G. Davis
His Attorney.

Patented July 8, 1924.

1,500,860

UNITED STATES PATENT OFFICE.

SEIGO YÔ, OF TOKYO, JAPAN, ASSIGNOR TO GENERAL ELECTRIC COMPANY, A CORPORATION OF NEW YORK.

ELECTRIC CONTROL SYSTEM.

Application filed May 17, 1922. Serial No. 561,615.

*To all whom it may concern:*

Be it known that I, SEIGO YÔ, a subject of the Japanese Empire, residing at Tokyo, Japan, have invented certain new and useful Improvements in Electric Control Systems, of which the following is a specification.

This invention relates to an electric control system and in one embodiment comprises a plurality of alternating current motors, the speeds of which are responsive to the frequency of the supply source. These motors are connected to two distribution lines, the frequency of the electric power supplied to one of which being variable at will by means of a frequency changing device. The motors are grouped in one or more pairs, the motors of each pair being connected respectively to the distribution lines and associated with each other through differential mechanisms so as to form one or more motor devices by means of which motion may be transmitted to any movable object. The object of the invention is to facilitate accuracy of manipulation and obtain reliability of operation. In one of its applications the invention may be applied to turn a plurality of objects, for example a searchlight and a telescope, at the same time in the same direction.

Figure 1:
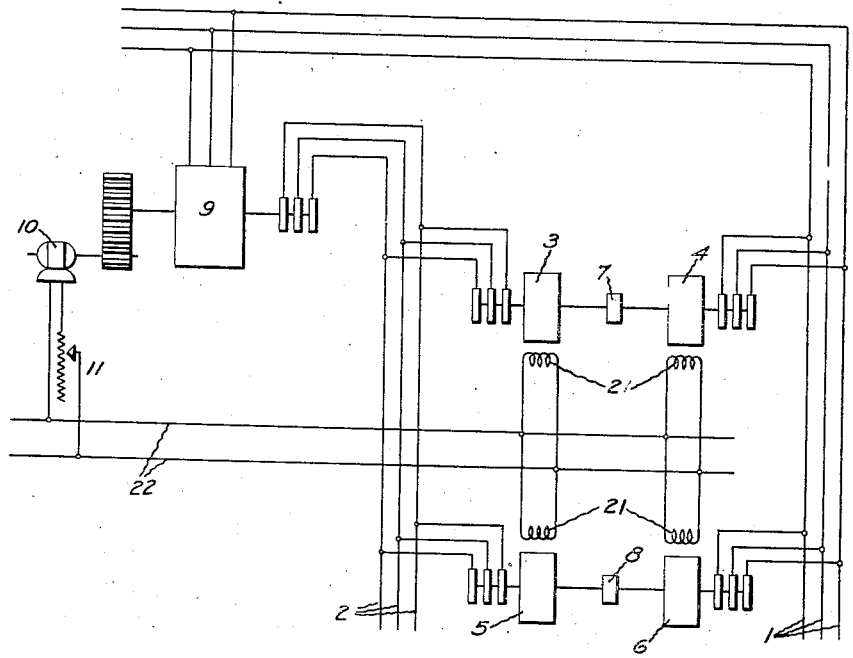
Figure 2:
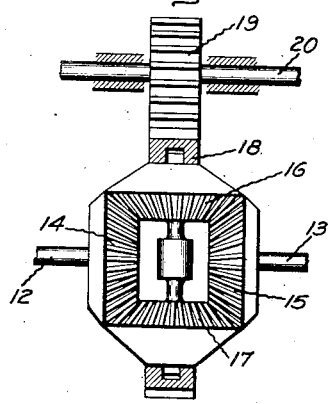
Figure 3:
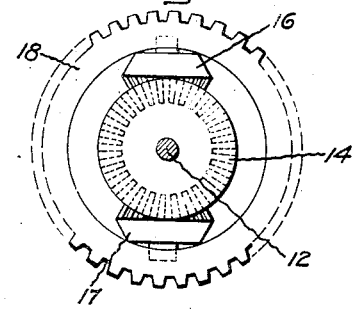

In the appended drawing which represents one embodiment of the present invention, Fig. 1 is a diagrammatic view showing the electric connections; Fig. 2 is an elevation view of an example of a differential driving mechanism to be geared to a movable body and associated with a pair of motors, while Fig. 3 is a partial side elevation view of Fig. 2. In the drawing similar symbols represent similar parts.

In one of its aspects, the present invention relates to an electric control system so designed as to apply motions having a definite relation to each other simultaneously to a plurality of objects, such as a searchlight and a telescope. The invention may obviously be used however in controlling the movements of a single object. Referring to the drawing, in carrying out the invention in one form a plurality of alternating current electric motors, for example, synchronous motors 3, 4 and 5, 6, are connected to electrical supply mains 1 and 2 which may be supplied with electrical energy at different frequencies. The motors 3 and 4, which are connected respectively to the supply mains 1 and 2, and the motors 5 and 6, similarly connected to the supply mains, are so coupled together as to form two motor or driving devices. Obviously by providing a corresponding number of pairs of motors any number of motor devices may be provided. As shown in the appended drawing, the two shafts of the electric motors of each pair are coupled with differential mechanisms 7 and 8, whereby the resultant motions of the motors of each pair may be transmitted to the objects, for example, a searchlight and a telescope (not shown), by means of the differential mechanisms so as to move these bodies in a constant relation with each other.

The synchronous motors are shown in the drawing as having field coils 21 which are excited from a direct current supply source 22. The frequencies to be applied to the two motors of each pair, for example 3 and 4, are made different by means of an induction frequency changer 9, connected so as to supply mains 2 with electrical energy from mains 1 which are in turn supplied from a suitable source of electrical energy. By means of this arrangement the speeds of motors 3 and 5 can be varied by changing the frequency of the voltage impressed on them, and the speeds of the motors of each pair consequently made different from each other. A direct current motor 10 is provided for driving the frequency changer 9, through suitable gearing, and the speed of motor 10 may be adjusted by suitable means, such as by a rheostat 11, so as to supply various frequencies to motors 3 and 5 depending on the speed required of these motors.

Although the differential mechanisms 7 and 8 may be of any suitable construction, in the example shown in Fig. 2, mitre wheels 14 and 15 are provided coupled respectively to the two shafts 12 and 13 of the paired machines 3, 4 or 5, 6, and engaging two other mitre wheels 16 and 17 between the two mitre wheels 14 and 15. A transmitting wheel 18 connected to the mitre wheels 16 and 17 engages a driven wheel 19. The shaft 20 of the driven wheel 19 moves the desired object, such as a searchlight or a telescope, through suitable mechanism (not shown), or in other words, the driven object is turned through a proper angle in response to the direction of turning and the number of revolutions of the shaft 20. By means of this arrangement, when the two shafts 12 and 13 are turned in opposite directions, if the speeds of these two shafts are equal, the mitre wheels 16 and 17 turn only around their own axis, and do not revolve around the mitre wheels 14 and 15. Accordingly the transmitting wheel 18 does not revolve and therefore does not turn the driven wheel 19, and the shaft 20 is consequently at rest and does not move the driven object. But when there is a difference in the speeds of the two shafts 12 and 13, the mitre wheels 16 and 17 will revolve round the mitre wheels 14 and 15 with the result that the transmitting wheel 18 revolves in response and transmits its motion through shaft 20 to drive the object for any predetermined amount, for example, for the required angle. The direction of turning can be controlled by increasing or decreasing the speed of one shaft, for example 12, with relation to the other shaft 13. Such a difference in the speeds of the two shafts may be obtained in the embodiment of the invention shown in the drawing by means of a difference in the frequency of the electrical energy supplied to the pairs of motors 3, 4 and 5, 6, and this difference in frequency can be obtained in the embodiment shown in the drawing by regulating the speed of the driving motor 10, whereby the speed of the induction frequency changer 9 is regulated so as to increase or decrease the frequency of the source 2 with relation to the source 1, which may have a substantially constant frequency. Since in this manner the relative speeds of the paired motors 3, 4 and 5, 6 are changed simultaneously in the same manner, the driven objects, for example a searchlight and telescope, will be moved through the same angle in the same direction in any plane. If it is desired to effect a vertical motion at the same time, it will be obvious that two more similar motor devices operatively connected to the driven objects will be required, but this application of the invention has been omitted in the drawing for the sake of clearness.

The above is the explanation with respect to an example of the present invention. As another example, the speed of the motors may be changed in the same manner by using ohmic drop exciters in place of the frequency changers. Obviously any suitable differential mechanisms may be used other than the particular form shown in Fig. 2, and it is clearly to be understood that various alterations can be applied without deviating from the essential principle of the present invention.

In short the present invention is for an electrical control system for moving an object as desired and for giving similar motion at the same time to a plurality of movable objects which are coupled respectively to two or more than two motor devices, and it is particularly adapted for the simultaneous manipulation of searchlights and telescopes.

What I claim as new and desire to secure by Letters Patent of the United States, is,—

1. An electric control system comprising in combination with a movable object, a pair of frequency responsive alternating current motors, driving means for said object differentially associated with said motors, a source of alternating current supply and electrical connections between said supply source and said motors including means for varying the frequency of the energy supplied to one of said motors to control the movements of said object.

2. An electric control system comprising in combination with a movable object, a pair of frequency responsive alternating current motors, driving means for said object differentially associated with said motors, a source of alternating current supply for said motors, a frequency changer interposed in the connections from said supply source to one of said motors, and means for controlling the speed of said frequency changer to control the movements of said object.

3. An electrical control system comprising in combination with a movable object, a pair of frequency responsive alternating current motors, a differential driving connection between said motors and said object whereby said object is driven at a speed proportional to the difference in the speeds of said motors, a source of alternating current supply, and electrical connections between said supply source and said motors including means for varying the frequency of the energy supplied from said source to one of said motors so as to vary its speed.

4. An electric control system comprising a plurality of movable objects, pairs of frequency responsive alternating current motors, driving means for said objects differentially associated with said pairs of motors, a source of alternating current supply and electrical connections between said supply source and said motors including means for varying the frequency of the energy supplied to one motor of each pair to control the movements of said objects.

5. An electric control system comprising a plurality of movable objects, pairs of frequency responsive alternating current motors, driving means for said objects differentially associated with said pairs of motors, a source of alternating current supply for said motors, a frequency changer interposed in the connections from said supply source to one motor of each pair, and means for controlling the speed of said frequency changer to control the movements of said objects.

In witness whereof, I have hereunto set my hand this 24th day of April, 1922.

SEIGO YÔ.